United States Patent
Bauersfeld et al.

(10) Patent No.: US 6,189,024 B1
(45) Date of Patent: *Feb. 13, 2001

(54) BROWSING SESSION RECORDING PLAYBACK AND EDITING SYSTEM FOR GENERATING USER DEFINED PATHS AND ALLOWING USERS TO MARK THE IMPORTANCE OF ITEMS IN THE PATHS

(75) Inventors: Kristin Bauersfeld, Half Moon Bay; Scott Putterman, Cupertino, both of CA (US)

(73) Assignee: Netscape Communications Corporation, Mountain View, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/003,195

(22) Filed: Jan. 6, 1998

(51) Int. Cl.[7] ................... G06F 15/16; G06F 15/173; G06F 13/00

(52) U.S. Cl. ................... 709/203; 709/224; 345/356; 707/10

(58) Field of Search .................... 345/356, 357; 709/217, 219, 223–227, 250, 100–103

(56) References Cited

U.S. PATENT DOCUMENTS

| | | | |
|---|---|---|---|
| 5,335,342 | * 8/1994 | Pope et al. | 714/38 |
| 5,727,129 | * 3/1998 | Barrett et al. | 706/10 |
| 5,761,436 | * 6/1998 | Nielsen | 709/245 |
| 5,774,123 | * 6/1998 | Matson | 345/357 |
| 5,809,250 | * 9/1998 | Kisor | 709/227 |
| 5,854,630 | * 12/1998 | Nielsen | 345/352 |
| 5,890,172 | * 3/1999 | Borman et al. | 707/501 |
| 5,907,843 | * 5/1999 | Cleron et al. | 707/10 |
| 5,964,839 | * 10/1999 | Johnson et al. | 709/224 |
| 5,991,773 | * 11/1999 | Tagawa | 707/203 |
| 6,002,871 | * 12/1999 | Duggan et al. | 717/4 |
| 6,008,807 | * 12/1999 | Betschneider et al. | 345/339 |
| 6,012,086 | * 1/2000 | Lowell | 709/218 |

(List continued on next page.)

OTHER PUBLICATIONS

The SiteMarker 1.0 Guide, www.ummhmm.com/sitemarker/1.0 Tutorial, pp. 1–53, Oct. 1996.*
SiteMarker Screen Shots, www.ummhmm.com/sitemarker/screens.html, pp. 1–3, Jan. 1996.*
SiteMarker Overview, www.ummhmm.com/sitemarker/features.html, pp. 1–5, Jan. 1996.*

*Primary Examiner*—Zarni Maung
*Assistant Examiner*—Andrew Caldwell
(74) *Attorney, Agent, or Firm*—Michael A. Glenn; Kirk Wong

(57) ABSTRACT

A session navigation and recording system for a computer environment automatically records every web page that the user visits, thus preserving the context of the paths and allowing the user to view all of the paths traversed in a session which are placed in a file. The user navigates through the saved session paths using a session history toolbar which allows the user to navigate through any selected session path and provides controls for backward, forward, pause, and record commands. Sessions can be automatically executed by the user with a time delay between each task. The user can edit and display any session path. Pages may be marked for different levels of priorities and also for aging, i.e. marked to expire within a certain time span or by a certain date. The user also creates a custom path comprised of web pages, macros, filters, search queries, email, and any object that can be acted upon, including other application programs and may also be combined with all or part of a session path. The user defined paths are executed in the same manner as session paths.

30 Claims, 4 Drawing Sheets

U.S. PATENT DOCUMENTS

| | | | |
|---|---|---|---|
| 6,012,093 | * | 1/2000 | Maddalozzo, Jr. et al. ......... 709/223 |
| 6,018,342 | * | 1/2000 | Bristor ................................. 345/354 |
| 6,035,332 | * | 3/2000 | Ingrassia, Jr. et al. .............. 709/224 |
| 6,044,398 | * | 3/2000 | Marullo et al. ...................... 709/219 |
| 6,052,730 | * | 4/2000 | Felciano et al. ..................... 709/225 |
| 6,119,147 | * | 9/2000 | Toomey et al. ...................... 709/204 |

* cited by examiner

BROWSING SESSION RECORDING PLAYBACK AND EDITING SYSTEM FOR GENERATING USER DEFINED PATHS AND ALLOWING USERS TO MARK THE IMPORTANCE OF ITEMS IN THE PATHS

BACKGROUND OF THE INVENTION

1. Technical Field

The invention relates to the navigation and task management of network browsers in a computer environment. More particularly, the invention relates to the recording and storing of user navigational paths and tasks for network browsers and computer programs in a computer environment.

2. Description of the Prior Art

Modern Internet browsers allow users to navigate through websites easily. Most browsers provide some type of device that enables the user to backtrack through previously visited web pages. This "history" function generally lasts throughout the time that a user instantiates the browser program until the point where the browser is terminated. This time period is what traditionally defines a "session." The session history function on browsers record the current navigation path of the user, i.e. it is a single-threaded path. Referring to FIG. 1, browsers 101 provide back 102 and forward 103 buttons which are used to traverse the path.

With respect to FIG. 2, a drawback to this approach is apparent when a user navigates through a path on a typical browser, visiting page A 201 first. Page B 202 is then visited, followed by page C 203. The user backtracks up this path to page B 205 and deviates to page D 207. Once the user goes off the path, information about the previous path that was deviated from is lost. Here, the fact that the user visited page C 206 after page B 205 is lost. Only the path of pages A 204, B 205, and D 207 exists.

Another approach uses a global history, where every page that is visited is recorded and the user has the ability to get back to any of the previous pages visited. However, there is no context associated with global history. The paths can be sorted by date which means that as long as the user visits all of the pages in the global history only once, then she is able to tell what other pages were visited in that time period. This gives the user an idea of her activities within a certain time frame. However, if the user revisits a page, then the time stamp for that page is updated and all context is lost because each site is saved only once, not multiple times. Global history only records the first and last visited date for any page. The user is unable to tell what other pages were visited within the previous time period.

Further, one other approach allows the user to create a list of pages that she is interested in and which defines her path. The user navigates through the custom path in the browser. The back and forward buttons in the browser operate on the path. This allows the user to use the same path multiple times. However, there is only one list and it is single-threaded.

It would be advantageous to provide a session navigation system that records and categorizes all of the paths that a user navigates through in a session. It would further be advantageous to provide a session navigation system that is centralized and enables the user to designate multiple custom paths which include tasks that cross application programs.

SUMMARY OF THE INVENTION

The invention provides a session navigation and recording system. The invention uses an easily configured session recording system that automatically records all of the web pages that the user visits during a session and organizes them into paths. In addition, the invention uses a user-definable path system that enables the user to create paths that include web pages, macros, filters, search queries, and any object that can be acted upon, such as application programs.

In a preferred embodiment of the invention, the system automatically records every web page that the user visits. This preserves the context of the paths and allows the user to view all of the paths traversed in a session. The session paths are placed in a file.

The user navigates through the saved session paths using a session history toolbar. The toolbar allows the user to navigate through any selected session path and provides controls for backward, forward, pause, and record commands. Sessions can be automatically executed by the user with a time delay between each task.

The invention enables the user to edit and display any session path. Pages may be marked for different levels of priorities and also for aging. Pages may be marked to expire within a certain time span or by a certain date.

Further, in another preferred embodiment of the invention, the user creates a custom path comprised of web pages, macros, filters, search queries, email, and any object that can be acted upon, including other application programs. User defined paths may also be combined with all or part of a session path. The user defined paths are executed in the same manner as session paths.

Other aspects and advantages of the invention will become apparent from the following detailed description in combination with the accompanying drawings, illustrating, by way of example, the principles of the invention.

DETAILED DESCRIPTION OF THE INVENTION

Figure 1:
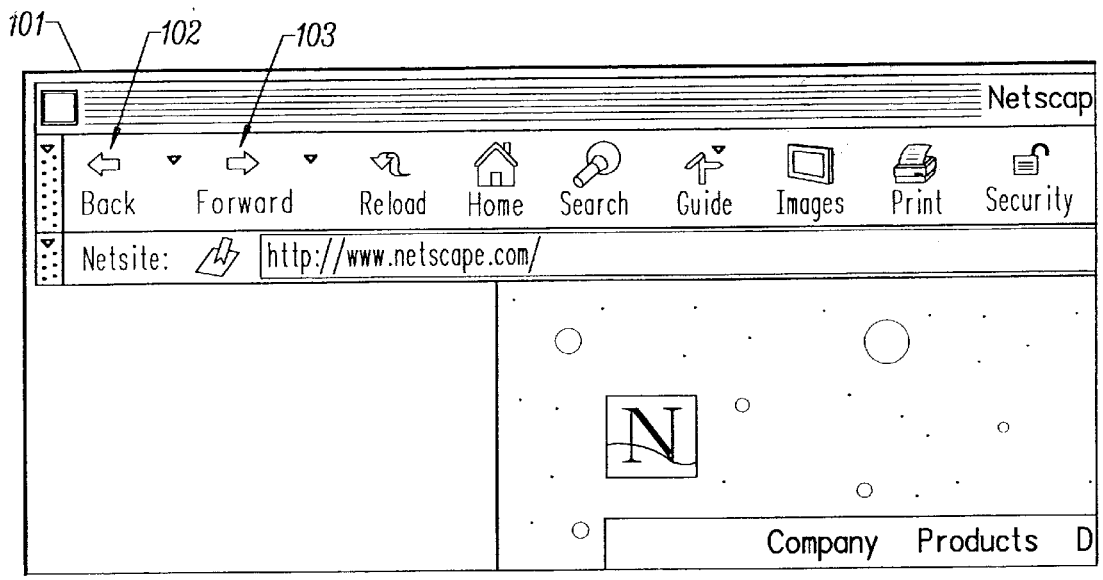
FIG. 1 is a schematic diagram of a web page containing Back and Forward buttons.
Figure 2:
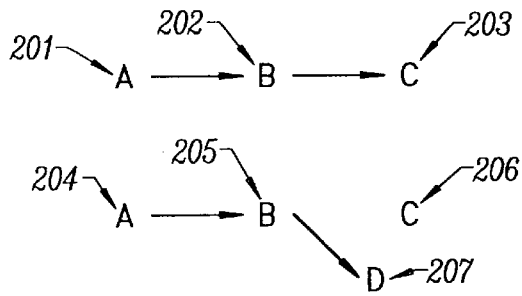
FIG. 2 is a block schematic diagram of the treatment of a path in the prior art.

As shown in the drawings for purposes of illustration, the invention is embodied in a session navigation and recording system for computer applications. A system according to the invention provides a centralized system capable of navigating multi-threaded paths defined by the system and the user.

A session navigation and recording system according to the invention provides an easily configurable system that records all of the web pages visited by the user within a session, allows the user to navigate through the recorded paths, and to edit and save the paths. The system additionally allows the user to record not only paths consisting of web pages, but also paths including email, macros, filters, search queries, and any object that can acted upon (e.g. application programs). An additional advantage is that paths are automatically executed by the user.

Paths

The current definition of a path is that it is a series of web pages. The invention extends this definition by adding any ordering of bookmarks, history, or other tasks through which a user can navigate.

The global history function in most browsers only records the first and last dates visited for any page. This means that context information about the paths that the user took to get to any Universal Resource Locator (URL) is easily lost whenever a page is revisited. Users often bookmark pages to remedy this because they are afraid of losing the pages in case they need to return to them later in their session.

Figure 3:
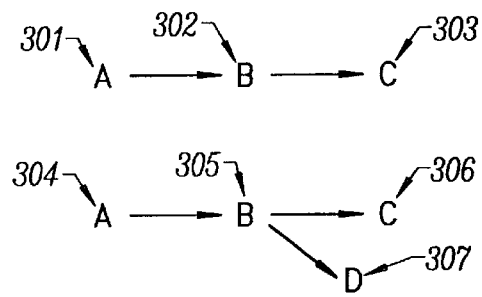
FIG. 3 is a block schematic diagram of the treatment of a path by the invention according to the invention.

The invention retains the context information of the paths that the user navigates. Referring to FIG. 3, the user first visits page A 301. The user then navigates to page B 302 and then to page C 303. The user backtracks to page B 305 and visits page D 307. The invention gives the user the ability to see that she traveled from page A 304 to page B 305 and then to page C 306. The user also sees the second path of page A 304 to page B 305 and then to page D 307. The invention keeps track of each page visited. This is represented in a tree or search dialog to the user.

Sessions

A session has a starting and ending point that not only varies from user to user but also varies among individual users depending on their situation. Sessions are definable by the user. The following are examples of sessions:

The session starts when the browser is started and ends when the browser is exited.

The session starts when the user comes into work and ends when the user goes home.

The session starts when a user searches for a service, such as Yahoo, and ends when the user has looked at all the pages on the topic on which it searched.

The session starts when the user presses a button indicating the start and ends when the user presses a button to end.

Session history is the history that the user accumulates during a session.

Session History Toolbar

Figure 4:
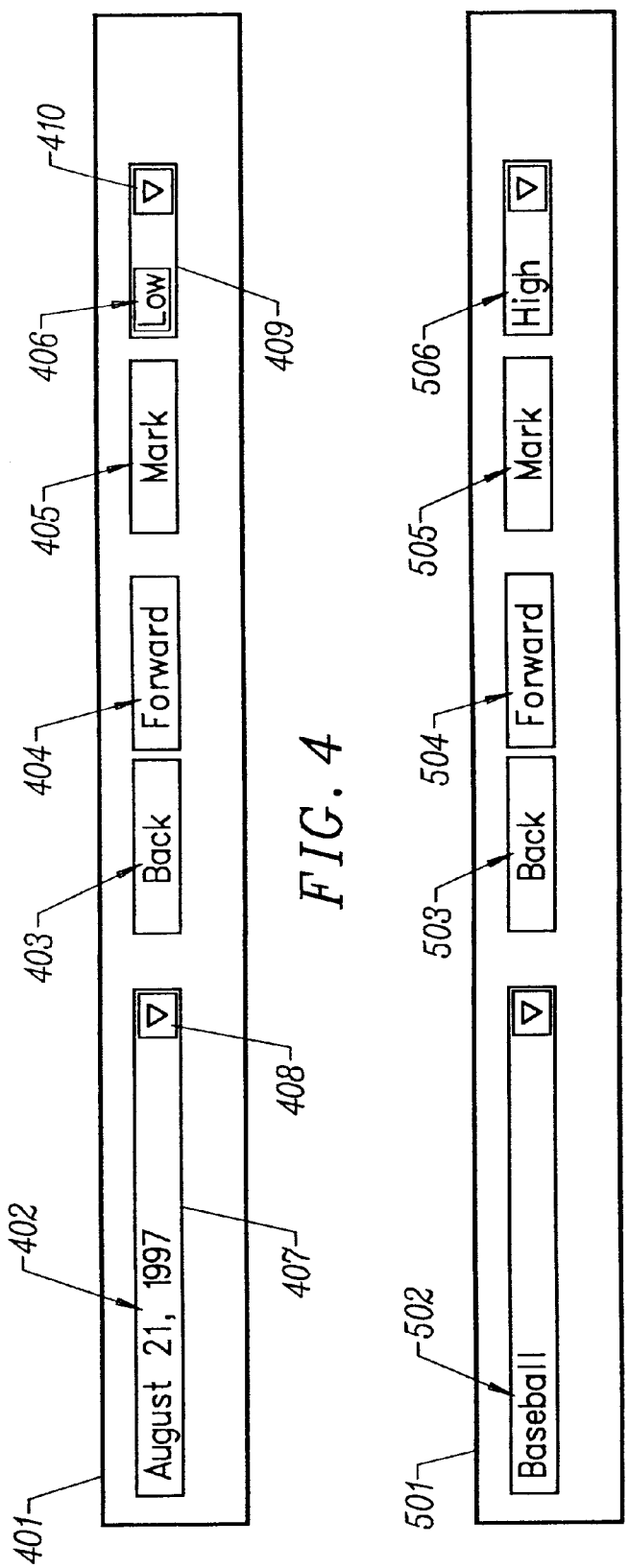
FIG. 4 is a schematic diagram of a session history toolbar using a date as the session history file name and a page mark importance of low according to the invention.
Figure 5:
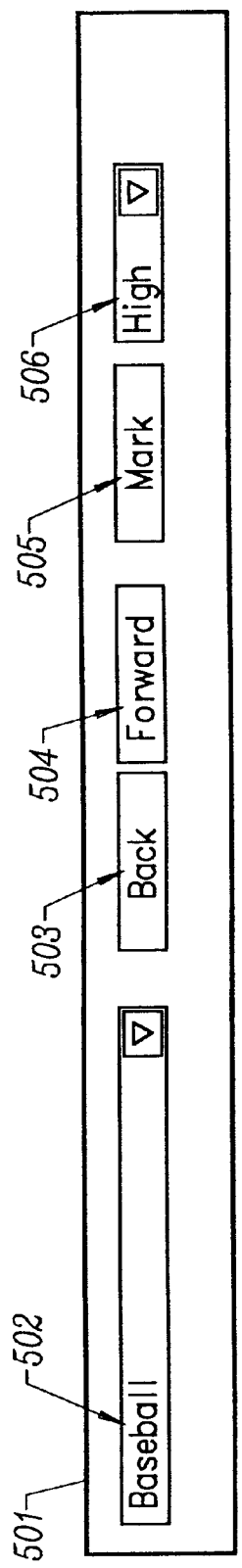
FIG. 5 is a schematic diagram of a session history toolbar using a subject as the session history file name and a page mark importance of high according to the invention.
Figure 6:
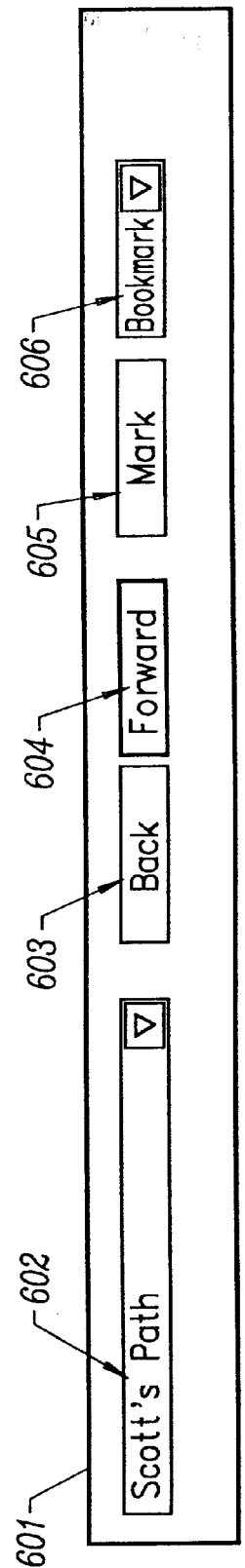
FIG. 6 is a schematic diagram of a session history toolbar using an arbitrary name as the session history file name and a bookmark as the page mark according to the invention.

Referring to FIGS. 4, 5, and 6, the session history toolbar 401 allows the user to organize sessions as well as revisit earlier sessions. The user specifies a session folder in which the pages that the user is currently visiting are be placed. A default folder, for example, is named using the current date 402. The "Back" 403 and "Forward" 404 buttons provide a way of traversing the current session path. The session history toolbar 401 additionally has controls similar to those on a tape recorder or VCR, i.e. record, playback, and pause.

The user has the option of selecting an existing folder in a drop down list 408 or type in a new folder name into the combo box 407. For example, the user may specify a more descriptive folder name such as "Baseball" 502 or "Scott's Path" 602, thereby providing an easy way to store new items in a separate folder until the user is ready to organize them.

In a preferred embodiment of the invention, the session is automatically defined and stored by the system.

All history items in these session folders would not be persistent beyond the number of days set in the user preferences. When a history item expires, it disappears. The user can reorganize the history items into any other folder.

The toolbar is used to navigate along any selected path. Straying from the path does not affect the navigation buttons. For example, if the user starts on a path and then diverts in another direction off of a link on a page and continues browsing off the saved path, the global back and forward buttons work as they do now, but the session history toolbar Back 403 and Forward 404 buttons only navigate along the selected path. Therefore, pressing the forward button 404 brings the user to the next item on the selected path.

As previously mentioned, a pause button also exists on the toolbar. If the user knows that she is about to be sidetracked, she presses the pause button to pause the path recording process. When the user returns to the path, she can start from where she left off rather than having to start from the beginning. The session history toolbar 401 Back 403 and Forward 404 buttons also have drop down menus that display items in the current path. Additionally, the user can mark the starting point for any path. The starting point does not have to be at the beginning of a session path.

The user may wish to save pages in the current session for later perusal, but may not wish to save these as bookmarks. The "Mark" button 405 on the toolbar 401 provides a way of organizing history items. Instead of having every page that the user visits placed into the current session folder, only pages that the user specifically marks go into this folder. All other pages go into the global history, as before.

There are several functions of the Mark button 405. One function is to place the current page in the current session history folder every time the Mark button 405 is clicked. The Back 403 and Forward 404 buttons traverse only those items that have been marked.

Another function provides the ability to mark the saved pages with levels of importance. In this example, the toolbar 401 has a drop down list 410. The current page can be marked as "High" 506 or "Low" 406 importance by pressing the Mark button 405. With respect to FIG. 6, the current page can be bookmarked 606 in the current folder.

For example, a user is looking at a series of pages on baseball. The user starts by marking the search results from Yahoo. She goes to Sports Zone and marks it. The user goes back to the Yahoo search results and then goes to the USA Today page. At this point the user does not wish to keep this page and does not mark it. The Major League baseball site is selected and is marked. When the user traverses this session path she can easily get back to the three pages that she cares about.

When the user searches through any of the history folders the pages can be filtered based on importance, only bookmarks, only history, only mail, by content, or any combination of data types. The user can also view what she did over a certain time period. For example, the user could choose to see what she did last Tuesday. A time line displays all of the items in one scrollable time chart. Older activities appear differently than newer activities.

Another option in the toolbar populates the toolbar with the web pages that are most important to the user, thereby allowing easy access to those pages. The pages the user visits the most show up on the toolbar and, as each page falls out of favor, they are removed from the toolbar. The user selects between differently populated toolbars.

Priority Levels

Priority levels allow the user to age certain pages, permanently store pages, or make a page very temporary. The user has a way to manage links instead of making multiple bookmarks because she is afraid of losing the links. The invention displays the path and allows the user to mark pages in the path. The invention provides the path information to any viewer that the user selects.

There are three levels of priority:

Permanent (bookmark). An indication that the user wants something permanently stored in the system. This includes at least web pages, and extends into messages, people, and files. Items that are bookmarked show up in their own list.

Interested in (marker). Indicates that the user is interested in something but does not know if it should be permanent. It is associated with an aging value which has a default and is user defined. A user uses this to help manage the large volumes of information that she does not want overloading her "permanent" storage (bookmark), or wants to go back to in the immediate future.

Temporary home (stake). This level provides for a different amount of importance than a marker. It is more like a pivot point and is more temporary than a marker. Stakes are more for navigation purposes rather than for "history" purposes, although they are still useful for history.

Automatic Path Execution

Automatic path execution applies automation to paths whereupon the user initiates the path (or a subsection of a path) and then no more user intervention is required to navigate the path. The user controls the automatic playback by pausing the playback, speeding up the playback, stopping the playback, skipping pages, seeking pages, or setting the time delay between pages.

Automatic Recording of Paths

The user often does not remember the URL for a certain page, but does remember the page that was visited before or after that page. In a preferred embodiment of the invention, every page that the user visited during a session is automatically recorded to reconstruct all of the paths that the user followed at any particular time. The user views these paths to find the path that was taken to get to that specific page, as well as the path taken afterward. This allows the user to plug in any path into the session history toolbar and use the back and forward buttons to re-play that path. This automatic session history enables the user to recreate any session.

Figure 7:
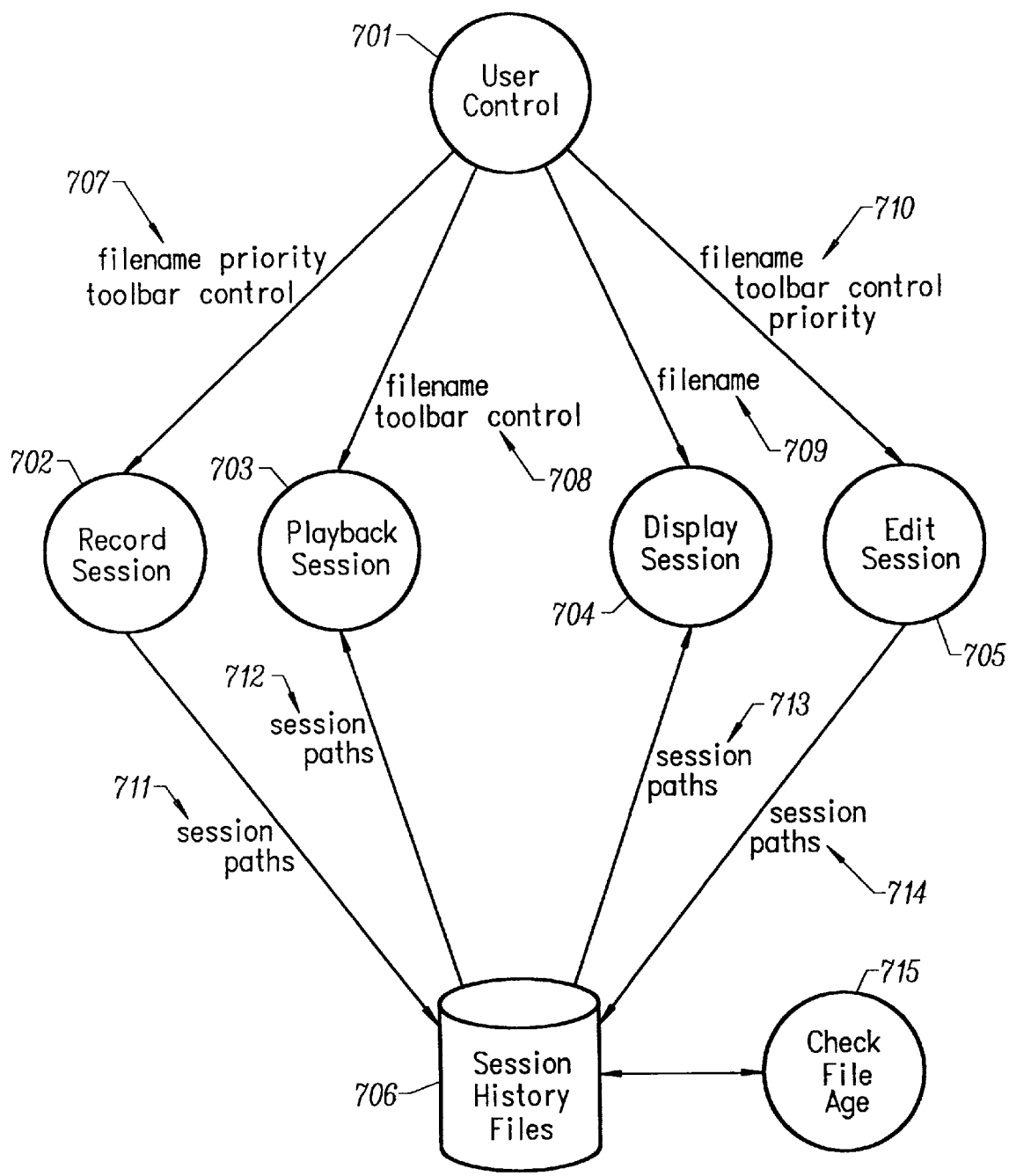
FIG. 7 is a block schematic diagram of the task sequence of an automatic session recording embodiment according to the invention.

Referring to FIG. 7, the user enters filenames, priorities, and toolbar control inputs through the User Control task 701. The Record Session task 702 automatically records and stores the pages that the user visits during a session and the associated path information into the Session History Files 706. The session paths 711 are placed in a file using the default name or the name that the user designated 707. The Playback Session task 703 allows the user to playback any selected session path 712 from the Session History Files 706. The user controls the playback through the toolbar control commands 708 sent through the User Control task 701. The Playback Session task 803 uses the user-configured time delay to delay between tasks when it automatically executes the session path 712.

Session paths are displayed to the user by the Display Session task 704. Any editing of sessions is performed through the Edit Session task 705 which allows the user to rename files, place pages in different files, mark page priority, and save the new session paths 714 into the Session History Files 706.

The Check File Age task 715 periodically checks the Session History Files 706 for any pages that have been marked to expire at a predetermined date or time span and removes any expired pages.

User Defined Paths

There are numerous tasks that a user performs on a daily basis and in the same order every time. The invention allows the user to automate these tasks from a central location.

In another preferred embodiment of the invention, user defined paths are provided wherein users add the sites that they visit and tasks that are performed routinely. For example, the user may routinely come into work and check her stock prices, read the news, visit an intranet page, read her email, read a newsgroup, and look at her calendar. Instead of having to search through the user interface to perform each of these different tasks, the user defines a path that includes all of these tasks. Paths contain macros, filters, search queries, and any object that can be acted upon. If the user has more than one routine, for example, a morning routine, an after lunch routine, and a project routine, then multiple paths are defined. Each path is plugged into the session history toolbar making following a daily path as simple as hitting the back and forward button.

This is also useful when giving presentations. Instead of having to search through the bookmarks or type in URLs, the user traverses a path that was created prior to the presentation.

Companies can provide training or tutorial paths through which new employees navigate that contain links to training programs or specialized applications.

Paths can be sent as attachments in email, thereby allowing users to share paths with each other and edit and use the paths independently.

Figure 8:
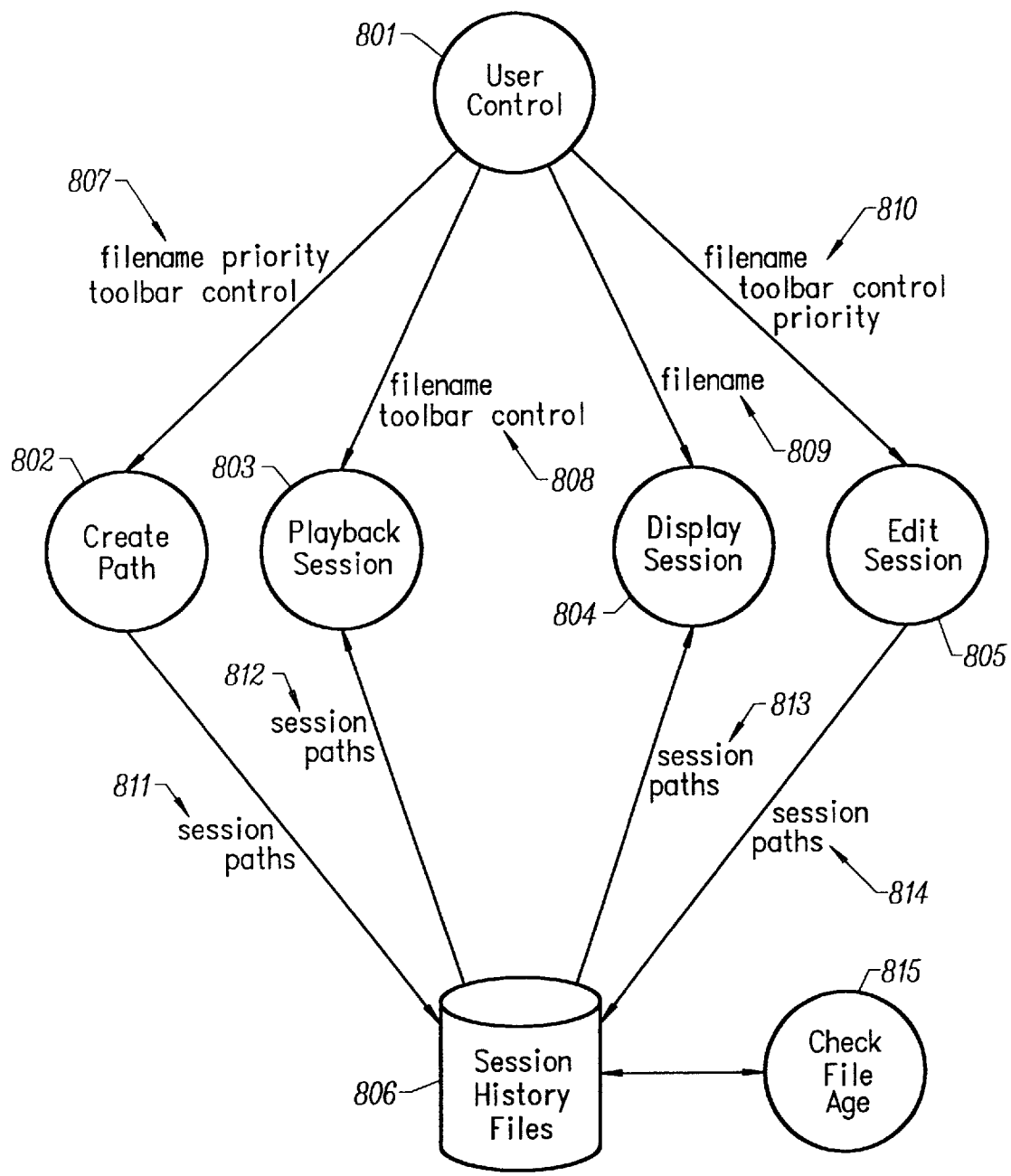
FIG. 8 is a block schematic diagram of the task sequence of a user defined path recording embodiment according to the invention.

Referring to FIG. 8, the user enters filenames, priorities, and toolbar control inputs through the User Control task 801. The Create Path task 802 allows the user to create a path comprising of web pages, macros, filters, search queries, and any object that can be acted upon, including other application programs. Session paths created automatically can also be edited and combined into the user defined paths. The Create Path task 802 stores the paths that the user defines into the Session History Files 806. The user-defined session paths 811 are placed in a file using the default name or the name that the user designated 807. The Playback Session task 803 allows the user to playback any selected session path 812 from the Session History Files 806. The user controls the playback through the toolbar control commands 808 sent through the User Control task 801. The Playback Session task 803 uses the user-configured time delay to delay between tasks when it automatically executes the session path 812.

Session paths are displayed to the user by the Display Session task 804. Any editing of sessions is performed through the Edit Session task 805 which allows the user to rename files, place pages in different files, mark page priority, and save the new session paths 814 into the Session History Files 806.

The Check File Age task 815 periodically checks the Session History Files 806 for any pages that have been marked to expire at a predetermined date or time span and removes any expired pages.

Although the invention is described herein with reference to the preferred embodiment, one skilled in the art will readily appreciate that other applications may be substituted for those set forth herein without departing from the spirit and scope of the present invention. For example, although the invention is described as being applied to Internet browsers, one skilled in the art can readily appreciate that the invention has many other applications. Accordingly, the invention should only be limited by the Claims included below.

What is claimed is:

1. A process for automatic session navigation and recording in a computer environment, comprising the steps of:
   recording each object visited and associated object path information;
   controlling said path recording step;
   playing back a selected path;
   editing a selected path;
   wherein said editing step allows marking the saved objects with levels of importance;
   wherein said selected path contains objects that include, but are not limited to: web pages, email, macros, filters, and search queries; and
   wherein paths can be transferred to and used by other users.

2. The process of claim 1, wherein said controlling step is controlled through a toolbar.

3. The process of claim 1, wherein said controlling step allows pausing said recording step.

4. The process of claim 1, wherein said playing step is controlled through a toolbar.

5. The process of claim 1, wherein said playing step automatically plays said selected path after said playing step is started.

6. The process of claim 5, wherein said playing step delays for a predefined time between each object in said selected path.

7. The process of claim 1, wherein said editing step allows marking the priority of an object in said path, thereby allowing aging of certain objects, permanently storing objects, or making an object temporary.

8. The process of claim 1, further comprising the step of:
   displaying a selected path.

9. The process of claim 8, wherein said displaying step displays said selected path based on time stamp values of each object in said path.

10. The process of claim 8, wherein said displaying step displays objects in said selected path based on the priority of said objects.

11. The process of claim 8, wherein said displaying step displays objects in said selected path in a tree form.

12. The process of claim 1, further comprising the step of:
    checking the age of objects in all paths.

13. The process of claim 12, wherein said checking step removes any pages that have expired.

14. The process of claim 1, wherein said editing step allows marking objects to expire after a predetermined date or time span.

15. The process of claim 1, wherein said editing step allows marking a current object which is then placed in the current session history folder, thereby allowing traversal of only those items that have been marked.

16. An apparatus for automatic session navigation and recording in a computer environment, comprising:
    a module for recording each object visited and associated object path information;
    a module for controlling said recording module;
    a module for playing back a selected path;
    a module for editing a selected path;
    wherein said editing module allows marking the saved objects with levels of importance;
    wherein said selected path contains objects that include, but are not limited to: web pages, email, macros, filters, and search queries; and
    wherein paths can be transferred to and used by other users.

17. The apparatus of claim 16, wherein said controlling module is controlled through a toolbar.

18. The apparatus of claim 16, wherein said controlling module allows pausing said recording module.

19. The apparatus of claim 16, wherein said playing module is controlled through a toolbar.

20. The apparatus of claim 16, wherein said playing module automatically plays said selected path after said playing module is started.

21. The apparatus of claim 16, wherein said playing module delays for a predefined time between each object in said selected path.

22. The apparatus of claim 16, wherein said editing module allows marking the priority of an object in said path, thereby allowing aging of certain objects, permanently storing objects, or making an object temporary.

23. The apparatus of claim 16, further comprising:
    a module for displaying a selected path to said user.

24. The apparatus of claim 23, wherein said displaying module displays said selected path based on time stamp values of each object in said path.

25. The apparatus of claim 23, wherein said displaying module displays objects in said selected path based on the priority of said objects.

26. The apparatus of claim 23, wherein said displaying module displays objects in said selected path in a tree form.

27. The apparatus of claim 16, further comprising:
    a module for checking the age of objects in all paths.

28. The apparatus of claim 27, wherein said checking module removes any pages that have expired.

29. The apparatus of claim 16, wherein said editing module allows marking objects to expire after a predetermined date or time span.

30. The apparatus of claim 16, wherein said editing module allows marking a current object which is then placed in the current session history folder, thereby allowing traversal of only those items that have been marked.

* * * * *